Patented Aug. 9, 1938

2,126,475

UNITED STATES PATENT OFFICE 2,126,475

PROCESS FOR THE PREPARATION OF NAPHTHOPHENAZINE DYESTUFFS

David X. Klein, Milwaukee, and Henry R. Lee, South Milwaukee, Wis., assignors to E. I. du Pont de Nemours & Company, Wilmington, Del., a corporation of Delaware No Drawing. Application April 22, 1936, Serial No. 75,748

3 Claims. (Cl. 260—29)

This invention relates to an improvement in the process for preparing naphthophenazine dyestuffs.

U. S. Patents 602,544; 603,013; 606,295; 940,354; 1,686,026 and 2,001,975 describe the preparation of dyestuffs by the condensation of 1,3-diarylamino-naphthalene sulfonic acids with p-phenylene-diamine and its derivatives, the condensation being effected by means of the oxidizing action of one of the reagents or by the use of additional oxidizing agents. These dyestuffs were first prepared by the condensation of the 1,3-diarylamino-naphthalene sulfonic acids with a compound which itself acted as an oxidizing agent, such as the amino-azo-benzene sulfonic acids or nitroso-arylamino sulfonic acids. It was later found that the condensation could be effected between the 1,3-diarylamino-naphthalene sulfonic acids and p-phenylene-diamine compounds by the use of added oxidizing agents, such as sodium dichromate.

In the condensation of the 1,3-diarylamino-naphthalene sulfonic acid and the p-phenylene-diamine compounds with oxidizing agents such as dichromates, a large amount of undesirable by-products are formed which although more soluble in the aqueous alcohol solution than the desired color are also precipitated from the solution together with the desired color when such oxidizing agents are used. The by-product color is most probably a naphthophenazine dyestuff of closely related structure but much inferior in general dyeing properties. In later processes for the preparation of these dyestuffs, a solution of the reactants was blown with air or oxygen to effect the condensation and this procedure has been used for the past number of years, as more particularly illustrated in U. S. Patents 940,354; 1,686,026 and 2,001,975.

We have now found that the desirable dyestuff can be obtained in more pure form and with a materially increased tinctorial yield, by carrying out the condensation with oxygen under conditions which prevent the escape of any of the reaction media, preferably under pressure. In carrying out the condensation by passing air or oxygen through the solution where the condensation is carried out in an aqueous alcohol reaction mixture in open equipment, it is impossible to maintain the necessary alcohol-water ratio to retain in solution the undesirable product which is formed and at the same time to allow the desired dyestuff to completely crystallize from the solution. Attempts have been made to maintain the alcohol-water ratio by the addition of a mixture of the same during the condensation. It has been found, however, that when once the undesired dyestuff has precipitated with the desired dyestuff, it is difficult or practically impossible to separate the two by any known procedure. It has also been found that in some cases where the alcohol-water ratio is varied the desirable dyestuff does not separate from the solution during the oxidation procedure but must be precipitated therefrom by the addition of salt which also precipitates the undesirable impurities.

By carrying out the process as more particularly described in U. S. Patent 940,354, but in a closed vessel using oxygen under pressure, thereby maintaining throughout the reaction the proper alcohol-water ratio, it has been found that the desired dyestuff separates out in crystalline form substantially free from undesirable by-products. It has also been found that by using oxygen under pressure materially increased yields of a more uniform product are obtained than by processes heretofore disclosed.

The following examples are given to more fully illustrate our invention.

Example 1

39 parts of 100% diphenyl-1,3-naphthylene-diamine-8-sulfonic acid (diphenyl epsilon acid) and 26.4 parts of 100% 4-amino-diphenylamine-2-sulfonic acid are dissolved in a mixture of 300 parts of water and 300 parts of 95% ethyl alcohol containing 20 parts of sodium carbonate in a suitable reaction vessel. A solution of copper-ammonium sulfate, prepared by adding 2 parts of copper sulfate to 5 parts of water and 5 parts 28% ammonia solution, is slowly added under agitation. The vessel is closed and the air displaced with oxygen. The mass is heated to from 25° to 50° C. and held at this temperature until the reaction is completed. Oxygen is continuously added to maintain an oxygen pressure of from 2 to 4 lbs. Higher or lower pressures may be employed. When the theoretical quantity of oxygen has been absorbed the mass is cooled to 20° to 25° C. and agitated until crystallization is complete. It is then filtered, washed with 200 parts of 50% alcohol and then with about 400 parts of cold water, and dried.

Example 2

39 parts of 1,3-diphenylamino-naphthalene-8-sulfonic acid and 31.4 parts of 4-amino-1-phenylamino-naphthalene-8-sulfonic acid are oxidized in a solution containing 230 parts of water and 80 parts of 95% alcohol in which is dissolved 20 parts soda ash, in the presence of a copper catalyst, by the procedure given in Example 1. High yields of a relatively pure greenish blue dyestuff are obtained.

Molecular proportions of other p-amino-diphenylamine or 4-amino-1-phenylnaphthylamine compounds, such as 4-amino-2'-methoxy-diphenylamine-2-sulfonic acid, 4-amino-2'-ethoxy-diphenylamine-2-sulfonic acid, 4,4'-diamino-diphenylamine-2-sulfonic acid, p-phenylene-diamine sulfonic acid, or p-phenylene-diamine, may be substituted for the particular diphenylamine sulfonic acids mentioned in the above example with equally desirable results.

Chemical analogues for diphenyl epsilon acid such as 1,3-di-p-toluidino-naphthalene-8-sulfonic acid or 1,3-di-p-anisidino-naphthalene-8-sulfonic acid may be substituted.

The temperature at which the oxidation is carried out may vary between 25 and 60° C., although the preferred temperatures are between 30 and 40° C. The time of oxidation will of course depend upon the particular temperature employed and the rate at which the oxygen is absorbed, which is also dependent upon the particular pressure used as well as the particular reactants employed.

The pressure may vary within wide limits, although for convenience in operation an oxygen pressure of from 1 to 13 inches of mercury is satisfactory.

We claim:

1. In the process for preparing naphthophenazine dyestuffs wherein a 1,3-diarylamino-naphthalene sulfonic acid is condensed with a p-phenylene-diamine compound in an alkaline aqueous alcoholic solution, the reactants, alcohol, and water being employed in such predetermined proportions as will result in maximum precipitation of the desired dyestuff containing a minimum quantity of impurities on completion of the reaction, the step which comprises carrying out the reaction in a closed vessel with the addition of oxygen, whereby the initial concentration of the reaction medium is maintained throughout the course of the oxidation.

2. In the process for preparing naphthophenazine dyestuffs wherein a 1,3-diarylamino-naphthalene sulfonic acid is condensed with a p-phenylene-diamine compound in an alkaline aqueous alcoholic solution, the reactants, alcohol, and water being employed in such predetermined proportions as will result in maximum precipitation of the desired dyestuff containing a minimum quantity of impurities on completion of the reaction, the step which comprises carrying out the reaction under pressure in a closed vessel with the addition of oxygen, whereby the initial concentration of the reaction medium is maintained throughout the course of the oxidation.

3. In the process for preparing naphthophenazine dyestuffs wherein a 1,3-diarylamino-naphthalene sulfonic acid is condensed with a p-phenylene-diamine compound in an alkaline aqueous alcoholic solution, the reactants, alcohol, and water being employed in such predetermined proportions as will result in maximum precipitation of the desired dyestuff containing a minimum quantity of impurities on completion of the reaction, the step which comprises carrying out the reaction in a closed vessel with the addition of oxygen, whereby the initial concentration of the reaction medium is maintained throughout the course of the oxidation, crystallizing the color after the oxidation has been completed and filtering it from the solution containing the more soluble color bodies.

DAVID X. KLEIN.
HENRY R. LEE.